(12) United States Patent
Flynn et al.

(10) Patent No.: US 8,958,771 B2
(45) Date of Patent: Feb. 17, 2015

(54) AUTOMATING WIRELESS CUSTOMER CARE

(71) Applicant: AT&T Mobility II LLC, Atlanta, GA (US)

(72) Inventors: Judson J. Flynn, Decatur, GA (US); Thomas W. Bonner, Smyrna, GA (US); Ted Charles Stine, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 164 days.

(21) Appl. No.: 13/670,216

(22) Filed: Nov. 6, 2012

(65) Prior Publication Data
US 2013/0064101 A1   Mar. 14, 2013

Related U.S. Application Data

(63) Continuation of application No. 11/682,691, filed on Mar. 6, 2007, now Pat. No. 8,315,623.

(51) Int. Cl.
  *H04Q 7/20* (2006.01)
  *H04W 24/04* (2009.01)
  *H04W 24/08* (2009.01)

(52) U.S. Cl.
  CPC .............. *H04W 24/04* (2013.01); *H04W 24/08* (2013.01)
  USPC ........... 455/405; 455/406; 455/407; 455/408; 455/423; 455/412.1; 455/414.2

(58) Field of Classification Search
  USPC ................................. 455/41.1, 456.1, 456.2
  See application file for complete search history.

(56) References Cited

U.S. PATENT DOCUMENTS

| | | | | |
|---|---|---|---|---|
| 7,287,193 | B2 * | 10/2007 | Ward .............................. | 714/43 |
| 7,904,760 | B2 * | 3/2011 | Shaffer et al. ................... | 714/57 |
| 2005/0033834 | A1 * | 2/2005 | Nutt .............................. | 709/223 |
| 2009/0106359 | A1 * | 4/2009 | Liebling ....................... | 709/203 |

FOREIGN PATENT DOCUMENTS

EP         1239688 A1 *  9/2002

OTHER PUBLICATIONS

OA dated Oct. 4, 2010 for U.S. Appl. No. 11/682,691, 35 pages.
OA dated Mar. 31, 2011 for U.S. Appl. No. 11/682,691, 17 pages.
OA dated Aug. 31, 2011 for U.S. Appl. No. 11/682,691, 19 pages.
OA dated Mar. 28, 2012 for U.S. Appl. No. 11/682,691, 21 pages.

* cited by examiner

*Primary Examiner* — Charles Appiah
*Assistant Examiner* — Randy Peaches
(74) *Attorney, Agent, or Firm* — Amin, Turocy & Watson, LLP

(57) ABSTRACT

Providing automated customer care for a mobile phone is described herein. By way of example, a system can include component(s) that can automatically detect and transmit an error in interfacing a mobile phone with a communication network. The system also can include a customer care component(s) that can receive the error, initiate an error resolution process, and automatically provide a plurality of options with which to contact customer care and/or utilize customer care resources.

17 Claims, 13 Drawing Sheets

AUTOMATING WIRELESS CUSTOMER CARE

CROSS-REFERENCE TO RELATED APPLICATION

This patent application is a continuation of U.S. patent application Ser. No. 11/682,691 filed Mar. 6, 2007, and entitled "AUTOMATING WIRELESS CUSTOMER CARE," the entirety of which is incorporated by reference herein.

BACKGROUND

Mobile communication devices have gained wide acceptance with the consuming public and offer an impressive array of features designed to share information between subscribers. The first widespread implementation of mobile devices, cellular telephones, utilized voice communication only. However, as computing circuitry has become increasingly mobile more features traditionally associated with the personal computer have been incorporated into cellular phones. Voice and data communication, such as video sharing, text chat and other media are capable of being shared between cellular devices.

Generally, as the functionality of mobile communication devices becomes more complex and their use more widespread, the desire for professional customer support increases as well. However, professional support is not always equipped with the best means for interacting with an average subscriber. Support personnel can require feedback from a subscriber in order to be most efficient. If a subscriber does not or cannot provide this information adequately, support personnel can require much more time to solve a problem. Consequently, the overall support experience can frustrate the subscriber.

On occasion, a problem with a network connection or network access point can render a provider's network, and associated professional support services, temporarily inaccessible. Furthermore, there is often no indication to a subscriber when such problem will change. Under these and similar circumstances a subscriber can believe a problem still exists long after it is rectified and consequently can underrate a provider's quality of service.

DETAILED DESCRIPTION

Figure 1:
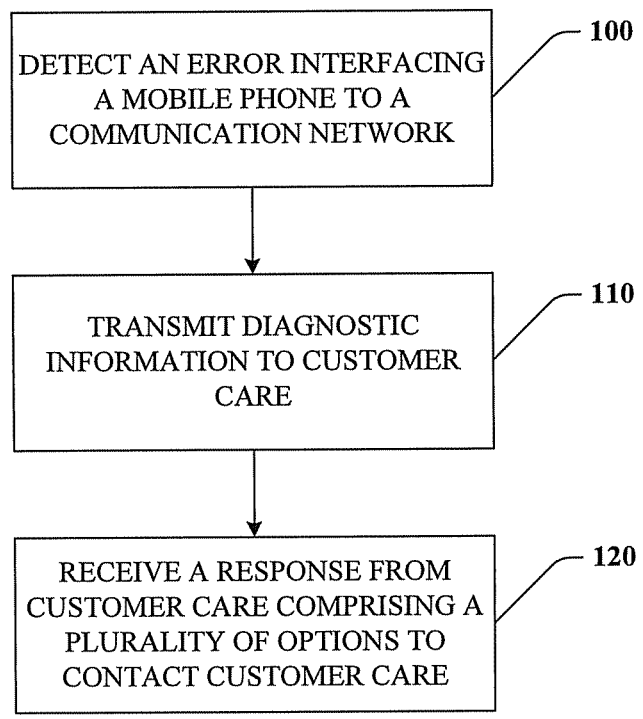
FIG. 1 is a high-level methodology for automatically detecting and reporting an error condition connecting a cellular telephone to a communication network.

The subject matter is now described with reference to the drawings. In the following description, for purposes of explanation, numerous specific details are set forth in order to provide a thorough understanding of the claimed subject matter. It can be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The subject matter described herein relates to providing automated or partially automated customer support to mobile phone (e.g., cellular phone, satellite phone, etc.) subscribers. By way of example, if an error occurs interfacing a mobile phone with a communication network, diagnostic information can be transmitted to a customer care entity identifying one or more sources of the error. Further, a response can be received from the customer care entity comprising a plurality of options for utilizing customer care resources and/or contacting the customer care entity. Such customer support can include, for instance, acts performed at the mobile phone, at the communication network, combinations thereof, or performed separate from both. In addition, a trouble ticket can be generated by the customer care entity containing the diagnostic information and one or more modes for correcting the error. The trouble ticket can be forwarded to a trouble resolution entity that can resolve the error and notify a subscriber of such. Alternately, or in addition, the trouble resolution entity can initiate contact with the mobile phone to obtain information necessary for resolving the error.

By way of another example, automated customer care can be provided to a dual-mode cellular/wireless fidelity (WiFi) (dual-mode) device attempting to access a communication network by way of a wireless router (e.g., a wireless local area network (WLAN), a wireless wide area network (WWAN), and the like). For instance, if a dual-mode communication device fails to register a media access control (MAC) address of a wireless router when attempting to register onto a communication service provider's network, a customer care entity can be automatically sent an error code indicating that a failure has occurred and identifying a source and cause of the failure. The dual-mode device can be prompted to display one or more options for a subscriber to contact and/or be contacted by a customer care entity.

By way of yet another example, a mobile phone user can be automatically contacted or notified of customer care options according to a user-specified contact profile. For instance, the user-specified contact profile can specify different methods relating to ways in which to contact the mobile phone user depending on, for example, the time of day, activities the user is engaging in (e.g., whether the user is in a meeting, on another call, driving, etc.) or whether the mobile phone is inaccessible or inoperable. A user-specified contact profile can contain an e-mail address, Instant Message profile, alternate phone number, or other method of contact. A user can modify the contact profile as desired; further, multiple contact profiles can exist such that the mobile phone user can select between multiple contact profiles as suitable.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Various features will become apparent from the following detailed description when considered in conjunction with the drawings.

Referring now to FIG. 1, a methodology is illustrated in accordance with the subject innovation. While, for purposes of simplicity of explanation, the methodologies are shown and described as a series of acts, it is to be understood and appreciated that the claimed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

FIG. 1 illustrates a methodology for providing automated or partially automated mobile customer care in accord with the claimed subject matter. At 100, an error condition relating to a mobile communication device interfacing with a communication network can be detected. The error can be detected by, for example, the mobile communication device, components of a communication network, e.g., a network access point (such as a cellular access point, a wireless local area network [WLAN] access point such as a wireless fidelity [WiFi] router, a wireless wide area network (WWAN) access point such as a worldwide interoperability for microwave access [WiMAX] router), a network controller (such as a base transceiver station [BTS] controller, an intelligent network peripheral, and the like), a network gateway, a network core or edge router, or any suitable combination thereof.

Examples of a communication network include any suitable mobile circuit-switched communication network including a global system for mobile communication (GSM) network, a time division multiple access (TDMA) network, a code division multiple access (CDMA) network, such as IS-95 and subsequent iterations of CDMA technology, an integrated digital enhanced network (iDEN) network and a gateway component of a public switched transport network (PSTN) accessed by a mobile network. Further examples can include any suitable data packet-switched or combination data packet/circuit-switched communication network, e.g., a wired or wireless internet protocol (IP) network such as a voice over internet protocol (VoIP) network, an IP data network, a universal mobile telecommunication system (UMTS) network, and other communication networks that provide simultaneous streaming voice and data communication over IP and/or simultaneous voice and data communication over combination data packet/circuit-switched technologies.

An example of a mobile communication device in accordance with methodology 100 includes a mobile phone, a cellular phone, a satellite phone, a VoIP phone, a dual-mode cellular/WiFi phone, a combination cellular/VoIP/WiFi/WiMAX phone or any suitable combination thereof. Specific examples of a mobile phone can include cellular devices such as GSM, TDMA, CDMA, IS-95 and iDEN phones and cellular/WiFi devices such as dual-mode GSM, TDMA, IS-95 or iDEN/VoIP phones, UMTS phones UMTS VoIP phones, like devices or combinations thereof.

At 110, diagnostic information can be transmitted to a customer care entity indicating a source and cause of an error. The diagnostic information can be sent by, for example, a mobile communication device, components of a communication network, e.g., a network access point, a network controller, a network gateway, a network core or edge router, or like devices, or combinations thereof. To limit duplicate transmissions, such devices can cross-reference the diagnostic information, prior to transmission, amongst other like devices configured to detect and/or transmit diagnostic information. For instance, if more than one device has detected and/or is prepared to transmit substantially similar diagnostic information related to an error, a single default device (e.g., specified by a service provider or a user-specified user profile) can send the transmission in lieu of others.

By way of additional example, if a cellular phone, cellular access point, and mobile network gateway device all detect an error condition related to a mobile phone interfacing with a communication network, the mobile phone and network gateway device can first transmit an error message to a default component, a cellular access point for instance, to determine if other mobile phone and/or network components also recognized the error. If more than one component detected the error, only a default component, for example the cellular access point, will transmit diagnostic information to a customer care entity, to avoid multiple transmissions associated with a single error being sent. It should be appreciated that any suitable component, whether a gateway, cellular telephone, access point or other component capable of recognizing and recording an error condition, can act as a default error transmission component.

At 120, a response can be automatically received from the customer care entity comprising a plurality of options for contacting the customer care entity and/or utilizing customer care resources. The response can be initiated by a customer care entity associated with, for example, a cellular network service provider, cellular telephone service provider, WLAN access device provider, broadband service provider, and/or cellular network operator, or the like. Moreover, the response can be received at the mobile phone without a mobile phone user first notifying a customer care entity of an error, for instance. Additionally, a response can include a request for more information regarding an error condition and/or a notification that an error was detected and that resolution of the error has begun or is complete. Also, the response can be transmitted by way of, for example, a cellular call, a text message, e-mail, voice message, or other means of remote communication or notification or combinations thereof. Furthermore, a mode of transmission can be in accordance with a user-specified contact profile.

Methodology 100 also provides for a user-specified profile in accord with the claimed subject matter. A user-specified contact profile can indicate one or more means and/or modes of communication (e.g., cellular call, text message, e-mail, voice message and the like) by which a customer care entity should contact a user. Such profile can further condition the means and/or mode of contact depending on other variables, for example, the time of day, activities the user is engaging in (e.g., whether the user is in a meeting, on another call, driving, etc.) or whether the mobile phone is inaccessible or inoperable. In a related aspect, a machine-learning component can be employed to dynamically evaluate information about a user and determine an optimal time and means and/or mode by which to contact a cellular telephone. For example, a machine-learning component can evaluate a user-specified contact profile, a GPS location of a user based on a GPS device on a mobile communication device, a current locale of a user based on GPS location, the time of day, a day of the week, or like objective criteria and determine an optimal mode and time by which to contact or notify a user.

A specific example can be as follows. A machine-learning component can receive an instruction to initiate contact with a user. It can then reference the date and time, and determine that it is 2:00 am on a Saturday, Eastern Standard Time. It can reference a location of a user and determine that the user is on Eastern Standard Time and therefore infer that a cellular call or voice message would not be a preferred method to initiate contact because of a heightened probability that a user can be asleep. Next machine-learning component can reference the type of contact required, e.g., an inquiry to obtain user information regarding an error, or a notification of a problem that has been or currently is being repaired. For an inquiry to obtain more information a machine-learning component can send e-mail to the user, for notification it can send text message instead.

As outlined by this example, methodology 100 can further comprise receiving a response from a customer care entity via a machine-learning device. In such a manner, receiving the response can be by way of a mode of communication determined most appropriate by the machine-learning component. This is but one example in which a machine learning component can determine an optimal mode of contact in accordance with the subject innovation. Similar aspects made known to one of skill in the art as a result of the context provided by this example are also incorporated into this disclosure.

Figure 2:
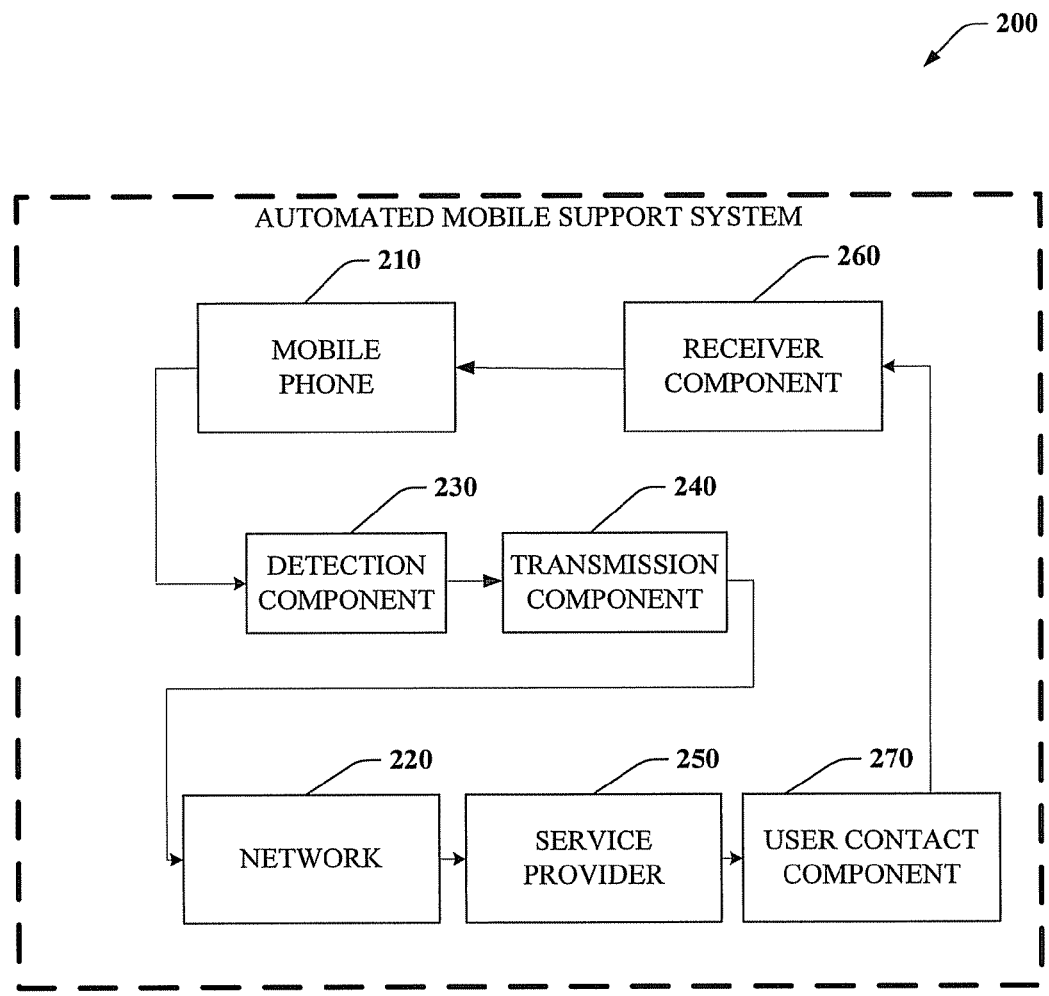
FIG. 2 is a high-level block diagram depicting a system for automated mobile support.

With reference to FIG. 2, a system 200 is illustrated that provides automated service provider support in accordance with the subject innovation. System 200 comprises a mobile communication device (e.g., mobile phone 210) having a communication link with a detection component 230 that can detect a failure relating to the mobile communication device in association with a network 220. Further, such component can gather information identifying one or more causes of the failure.

Detection component 230 can further include one or more components of a mobile communication device, a communication network (e.g., a network access point, a network controller, a network terminal etc.), or components separate from both such as inter-network components (e.g., a component that can route calls between one provider's network and another provider's network, between one type of communication network and another type of communication network, including a network gateway switching center, and the like), or combinations thereof. Components that can form all or a subset of all of detection component 230 are components of mobile phone 210, components of a cellular network and/or a WLAN or WWAN (e.g., a network access point, a network controller, a network gateway, a network core or edge router, or like devices) or combinations thereof.

A mobile communication device in accordance with system 200 can include a mobile phone (e.g., mobile phone 210), a cellular phone, a satellite phone, a VoIP phone, a dual-mode cellular/WiFi phone, a combination cellular/VoIP/WiFi/WiMAX phone, like devices or any suitable combination thereof. Network 220 can be a communication network as described supra. In addition, a failure relating to a mobile communication device associated with a network can include any suitable breakdown in a mobile communication process including registration (e.g., a failure to transmit ID data and/or subscription data to the network, a failure to register a media access control (MAC) address of a wireless router [e.g., WLAN and/or WWAN router] with a service provider), data transfer (e.g., a failure to maintain a sufficient data link between the mobile communication device and the network such that data can reliably be transferred there between), and like failures.

System 200 can further comprise a transmission component 240 that automatically transmits at least a portion of information identifying one or more causes of a failure detected by detection component 230 to a service provider 250. Transmission component 240 can further be comprised of components related to a mobile communication device, a communication network, an inter-network component, or combinations thereof (e.g., supra). In addition, the portion of information transmitted to service provider 250 can specify whether a cause of a failure is proximate the mobile communication device, the network, or combinations thereof. Service provider 250 can be associated with, for example, a cellular network service provider, cellular telephone service provider, WLAN and/or WWAN access device or network provider, broadband service provider (e.g., DSL, cable, optical fiber Internet providers and the like), and/or cellular network operator.

System 200 also can avoid duplicate transmission of failure information in accord with various aspects of the claimed subject matter. Specifically, if detection component 230 is comprised of more than one device capable of detecting a failure, each of such devices can be configured to cross-reference other detection devices to determine whether information identifying a cause of a substantially same failure has been gathered by more than one device. If so, a default component will compile information gathered by each device. Such compilation can be forwarded to transmission component 240 for further handling as described supra. Alternately, transmission component 240 can reference each of the multiple detection devices to correlate information each has gathered and determine a failure that such information relates to. For instance, if both a component of a network access point and a component of a mobile communication device detect a substantially similar failure, the transmission component can reference both devices and determine whether or not a substantially similar failure has triggered the detection. If so, transmission component 240 can consequently send one transmission that includes information gathered by one or more of such devices. It should be appreciated that the detection component and transmission component can be comprised of one or more common units and/or devices in accord with various aspects of the disclosure.

Service provider 250 can analyze the failure and cause of failure, initiate a failure resolution process, and/or send information about options for contacting and/or utilizing service provider resources to a receiver component 260 (e.g., for user self-help information, knowledge database, frequently asked questions database, and the like). Furthermore, information can be forwarded by service provider 250 to a user contact component 270 to notify a user of a status of the failure resolution process. Service provider 250 can include, for instance, a communication network provider, communication device provider, broadband internet service provider (ISP), dial-up ISP, wireless router manufacturer, distributor, etc., and/or subset of a service provider including a customer care entity, technical support entity, device-failure resolution entity and the like.

Receiver component 260 can receive information about options for contacting and/or utilizing service provider resources to correct the failure. The options for contacting can include, e.g., a phone number, Internet and/or intranet website address, e-mail address, text message address, instant message (IM) address, and the like. The information about options can further include a request for a communication device user's input relating to the failure, can be to notify such user that a failure has been identified and has been corrected or is being corrected, or can be to provide self-help options, or combinations thereof.

User contact component 270 can be any suitable communication device including, for example, a mobile telephone, personal computer (PC), personal digital assistant (PDA), mainframe computer or terminal thereof, landline telephone, e-mail, text message system, paging device, voice message system, and similar contact and/or notification systems and devices. Diagnostic information can be received at user contact component 270 and a mobile communication device subscriber subsequently presented with a plurality of choices for contacting service provider 250 (e.g., a mobile communication device customer care provider, service provider, technical support, etc.) and/or utilizing service provider resources, as described supra.

System 200 can provide the plurality of options to receiver component 260 via a mechanism determined most optimal for a particular device-user. For example, user contact component 270 can reference a user-specified contact profile (not shown) before contacting a user. Such contact profile can specify different methods relating to ways in which to contact the mobile phone user depending on, for example, the time of day, activities the user is engaging in (e.g., whether the user is in a meeting, on another call, driving, etc.) or whether the mobile phone is inaccessible or inoperable, and also as otherwise described herein. Moreover, user contact component 270 can utilize a machine-learning component to calculate the best method of contacting a user based on objective information determined about a user including, e.g., user-specified contact profile information, type of communication available to contact a specific user, time of day, a day of the week, a GPS location of a user, as determined by a GPS mechanism of a communication device etc. By utilizing one or more of these and/or like mechanisms, system 200 can be much more effective in delivering support to a device-user than conventional systems.

Figure 3:
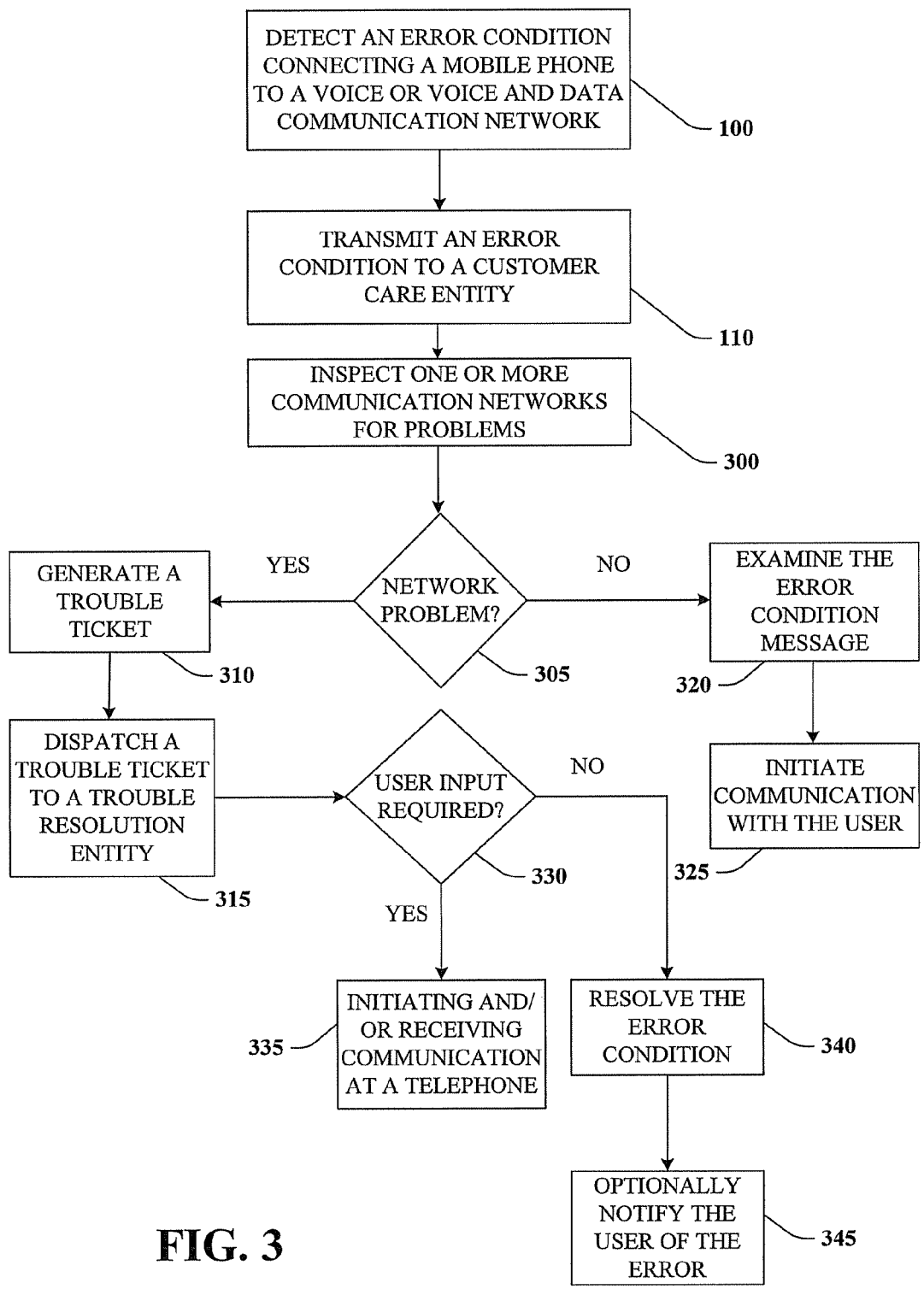
FIG. 3 depicts a methodology that detects the source of a connection error, determines whether user input is necessary, and either takes measures to correct the error or initiates contact with a user to obtain further information.

Referring now to FIG. 3, a methodology is illustrated that specifies further aspects of the claimed subject matter. At 100, an error condition connecting a communication device (e.g., mobile phone, cellular telephone, satellite phone, dual-mode cellular/WiFi device, etc.) to a voice or voice and data communication network can be detected. The error can be detected by, for example, the communication device, a communication network access point, e.g., a cellular access point and/or a WLAN access point, a network gateway, an internetwork device, or combinations thereof.

At 110, an error condition report can be transmitted to a customer care entity indicating a source and cause of an error. The same device that detected the error condition, or a different device, for instance, can send the error condition report. Furthermore, the error condition can be cross-referenced amongst various error detection devices, if more than one device is capable of detecting an error, to limit transmission of duplicate error conditions for a same or substantially similar error. At 300, one or more communication networks are inspected for problems, depending on the error condition detected. If, in a cellular network for example, an error condition occurred at a switching center routing traffic to a cellular telephone, only a network associated with the switching center might need inspection. If an error condition occurs at a gateway device interconnecting different mobile communication networks or interconnecting a mobile and non-mobile communication network, e.g., a PSTN, IP, and/or VoIP network, one or more networks can be inspected in order to determine a source of an error condition.

At 305, a determination can be made as to whether the source of a problem is network error. If so, the methodology proceeds to 310 and generates a trouble ticket identifying the error, its cause and its source. At 315 the trouble ticket generated at 310 can be dispatched to a trouble resolution entity associated with a service or network provider most closely related with the source of the error. For example, in regard to the cellular communication network example supra, if a source of an error is a gateway routing device, a trouble ticket can be dispatched to a trouble resolution entity associated with a network provider or network service provider responsible for the gateway routing device. If, instead, a source of error is a cellular access point, e.g., a cellular base transceiver station (BTS) or associated base station controller (BSC), a trouble ticket can be dispatched to a trouble resolution entity associated with a network service provider or other provider responsible for maintaining the cellular access point.

At 330, a determination can be made as to whether user input is needed to resolve the error, if so, communication is received at a cellular telephone from a trouble resolution entity or a customer care entity at 335 indicating a plurality of options for contacting customer care. Such communication can be to obtain information from a device-user. If user input is not necessary, the methodology proceeds to 340 and the error condition within the network is resolved, and at 345 the user can be notified of the error and that the error has been resolved.

Communication with a user, specified at 335, can be initiated by way of any suitable communication device including, for example, a mobile telephone, personal computer (PC), personal digital assistant (PDA), mainframe computer or terminal thereof, landline telephone, e-mail, text message system, paging device, voice message system, and similar contact and/or notification systems and devices. Furthermore, receiving communication from a customer care entity can be made in accordance with a user-specified contact profile (not shown) as described herein. Moreover, the type of communication can be determined by a machine-learning component as described in the subject disclosure. If, at 305, a determination is made that a source of the error is not within a network, the methodology proceeds to 320 where the error condition message can be examined to determine what information is required of the user, and at 325 communication can be initiated with the user as specified herein at step 335.

Figure 4:
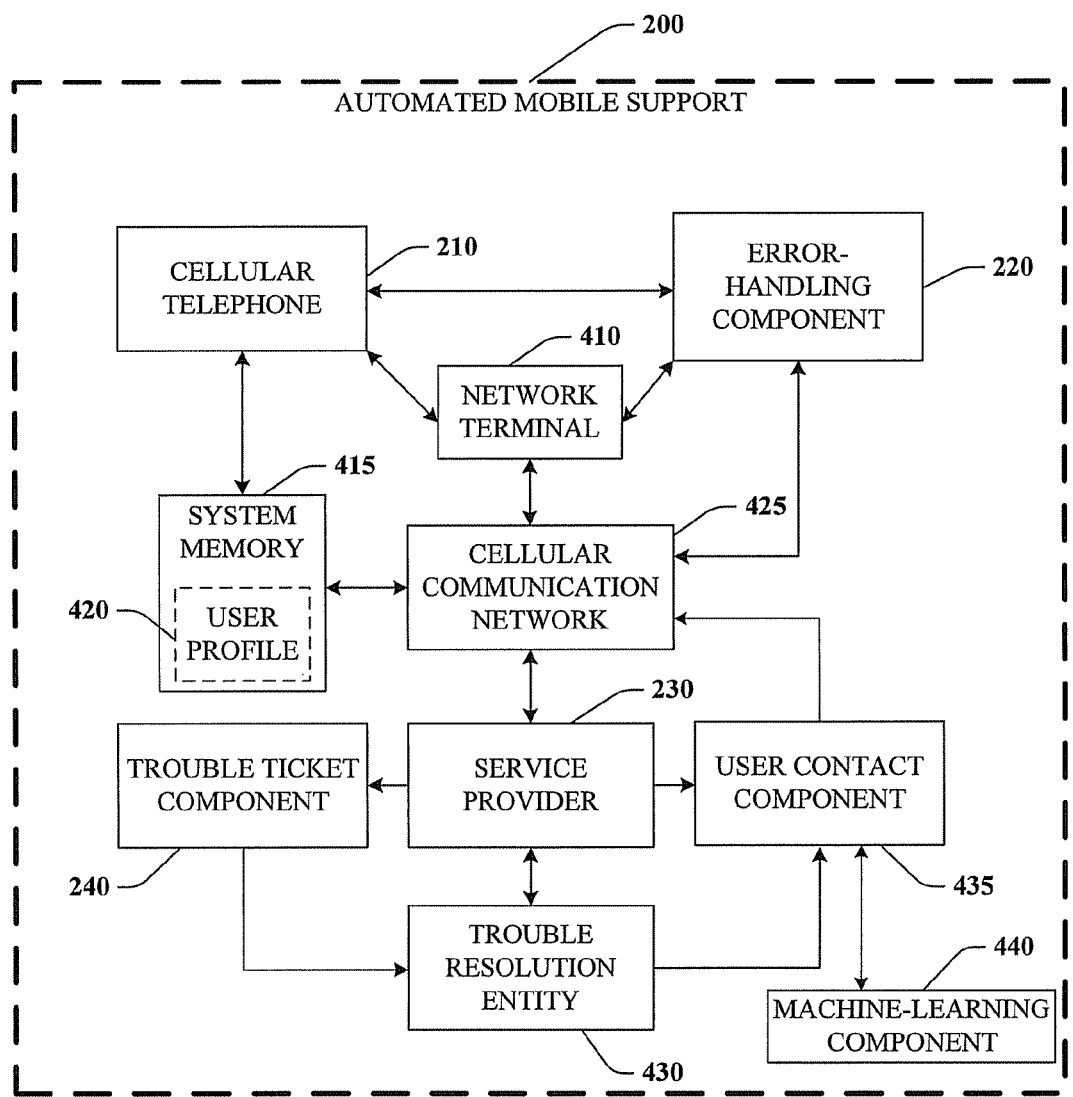
FIG. 4 depicts a detailed system for providing wireless customer care in accordance with the subject disclosure.

Referring now to FIG. 4, a system is illustrated that specifies further embodiments in accordance with the subject innovation. Automated mobile support system 200 can detect an error in connecting a cellular telephone to a communication network, transmit an error to a customer care entity, and initiate contact with a cellular telephone to obtain more information or notify a cellular telephone subscriber that the error has been or is being corrected. Cellular telephone 210 can be any suitable cellular telephone utilizing a circuit switched mobile network, packet switched network or circuit and packet switched networks described herein. Cellular telephone 210 is connected to an error handling component 220 that can detect and determine the cause of an error in connecting cellular telephone 210 to a communication network, and can further record and transmit the error and cause.

Error handling component 220 can include components of, for example, cellular telephone 210, a network gateway, network terminal 410, (e.g., a cellular switching center, base transceiver station, base station controller, WLAN access point, combinations thereof, and the like). After error-handling component 220 detects an error, determines its cause, and records the error and cause, error-handling component 220 sends an error condition record specifying the error and cause to customer care entity 230 by way of cellular communication network 425. Error handling component 220 can reference other network components capable of recording and transmitting an error and its cause to avoid duplicate error condition records being submitted for a single event, as described in the subject disclosure supra.

Error handling component 220 can send an error condition record to cellular communication network 425 to be routed to a customer care entity 230 associated with, for example, a cellular network service provider, cellular telephone service provider, WLAN access device provider, broadband service provider, and/or cellular network operator. Network terminal 410 can be any suitable network access point or initial relay point including, for example, a cellular switching center, base transceiver station, base station controller, WLAN access point or similar network access device. An error handling component can be located on network terminal 410. Network terminal is responsible for receiving, routing, and transcoding communication information between cellular telephones, such as cellular telephone 210, and other networks, e.g., cellular communication network 425, the Internet, an intranet or combinations thereof, or network components, e.g., network gateways switching centers and other network components and resources. Cellular communication network 425 can be any of the examples disclosed herein supra or any suitable network similar thereto.

Customer care entity 230 can be associated with, for example, a cellular network service provider, cellular telephone service provider, WLAN access device provider, broadband service provider, a cellular network operator, and combinations thereof. Customer care entity 230 can analyze the error and cause sent by error handling component 220, generate a trouble ticket 240 to initiate a problem resolution process, and request and initiate contact with a cellular telephone user by way of user contact component 435. User contact component 435 can be any suitable communication device capable of communication with cellular telephone 210 by way of cellular communication network 425 including, for example, a mobile telephone, personal computer (PC), personal digital assistant (PDA), mainframe computer or terminal thereof, landline telephone, e-mail, text message device, paging device, voice message device, and similar contact and/or notification devices. User contact component 435 can reference a user-specified contact profile 420 indicating a means by which to contact a user (supra). Moreover, user contact component 250 can reference a machine-learning component 440 to determine a best method of contacting a user, based on a type of communication available to user contact component 435, and further based on objective conditions including, e.g., user-specified contact profile 420, and others described herein.

Trouble ticket component 240 can be stored on any suitable physical or virtual medium utilized in communication including, for example, e-mail, text message, voice message, video message, digital file, analog audio message, physical written document, etc. Trouble ticket component 240 is created by customer care entity 230 and indicates an error in connecting cellular telephone 210 to a communication network, a cause of the error and a source of the error, as determined by error handling component 220 and customer care entity 230 respectively. Trouble ticket component 240 is dispatched trouble resolution entity 430 associated with a service or network provider most closely related with a source of the error.

For example, if a source of error is a gateway routing device, a trouble ticket can be dispatched to a trouble resolution entity associated with a network provider or network service provider responsible for the gateway routing device. If, instead, a source of error is a cellular access point, e.g., a cellular base transceiver station (BTS) or associated base station controller (BSC), a trouble ticket can be dispatched to a trouble resolution entity associated with a network service provider or other provider responsible for maintaining the cellular access point. Trouble resolution entity 430 can determine whether correction of a problem associated with an error requires information from a cellular telephone subscriber. If so, trouble resolution entity 430 can initiate contact with the cellular subscriber by way of user contact component 435 to obtain necessary information, and provide such subscriber a plurality of options for contacting customer care 230 and/or trouble resolution entity 430. If no information is required from a cellular telephone subscriber, trouble resolution entity 430 can resolve the problem, and can optionally utilize user contact component 435 to notify a cellular subscriber of the error and its status, e.g., whether a problem associated with an error is corrected or in the process of being corrected.

System memory 415 can be any suitable type of physical or virtual storage device for storing digital information as described in the subject disclosure infra. It can be located on various components of automated mobile support system 200, including cellular telephone 210 and cellular communication network 425 or one or more components thereof. System memory 415 is used, among other typical uses for memory devices, to store user-specified contact profile 420 and is connected to other network components including, for example, cellular communication network 425, and cellular telephone 210.

Figure 5:
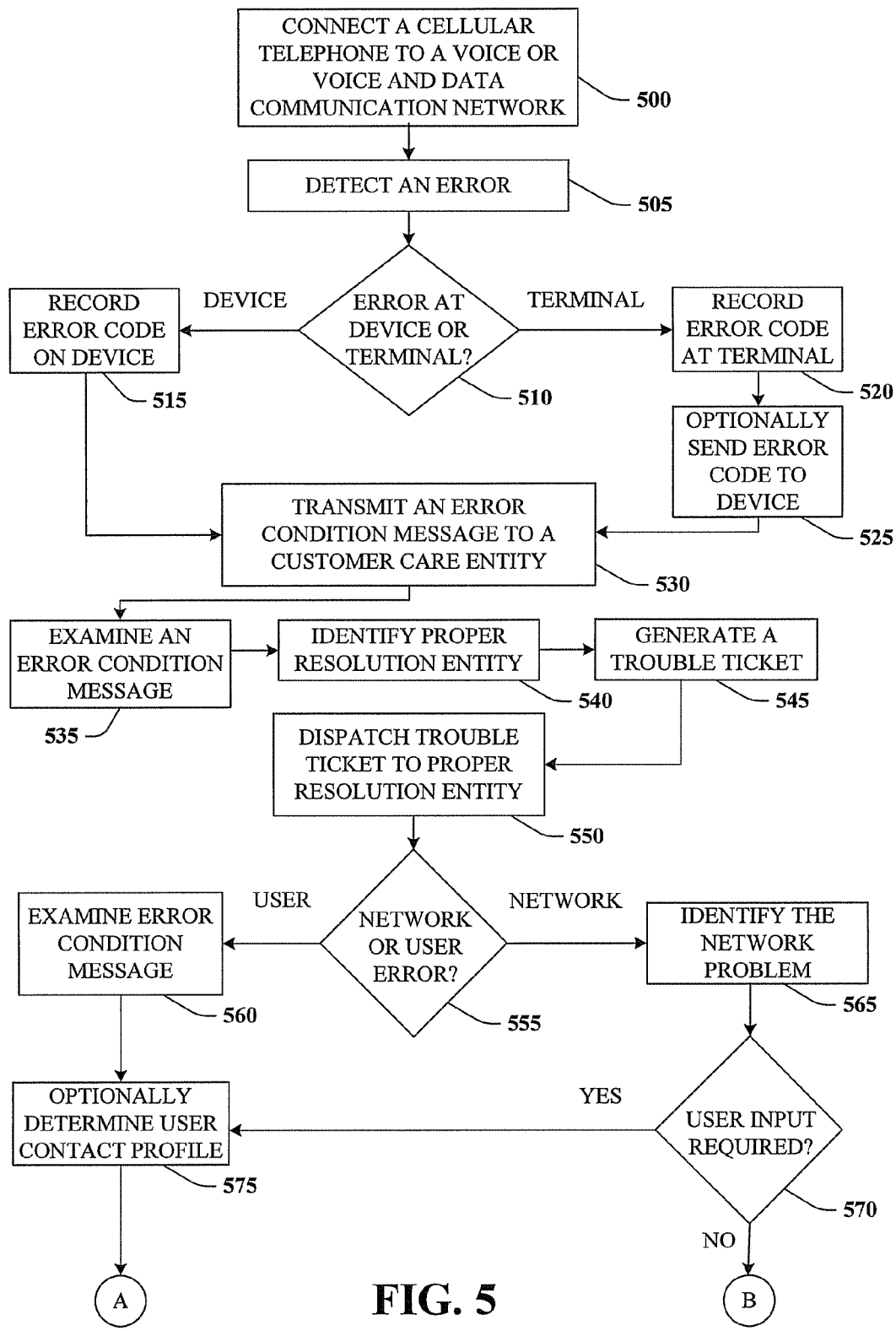
FIG. 5 is a detailed methodology for automatically providing wireless customer support.

Referring now to FIG. 5, a methodology for implementing one embodiment of the subject disclosure is illustrated. At 500, a cellular telephone connects to a voice or voice and data communication network, as described in this disclosure supra. At 505, an error can be detected. At 510, a determination can be made as to whether the error occurred at the cellular telephone, the device, or at a network terminal. If the error occurs at a network terminal, the methodology proceeds to step 520 where an error code specifying the error and its cause is recorded at the network terminal. At 525, the error code can be sent to the cellular telephone. The methodology proceeds to 530.

If the determination at 510 is that an error has occurred at the cellular telephone, an error code specifying the error and its cause is recorded at on the cellular telephone. At 530, the error code can be transmitted within an error condition message to a customer care entity. The customer care entity can be any suitable entity responsible for communication with, receiving information from, or otherwise relating to cellular telephone subscribers, and associated with, for example, a cellular network service provider, cellular telephone service provider, WLAN access device provider, broadband service provider, and/or cellular network operator. At 535, an error condition message can be analyzed to determine a source of the error and a service or network provider most closely related with the source of the error.

For example, if a source of the error is a gateway routing device, a network provider or network service provider responsible for the gateway routing device could be the most appropriate entity to resolve the problem. If, instead, a source of error is a cellular access point, e.g., a cellular base transceiver station (BTS) or associated base station controller (BSC) a network service provider or other provider responsible for maintaining the cellular access point could be the most appropriate entity to resolve a problem associated with the error. At 540, a resolution entity associated with the appropriate service provider can be identified. At 545, a trouble ticket can be generated indicating the error, the cause of the error and a source of the error. At 550, the trouble ticket is dispatched to the resolution entity identified at 545.

At 555, a determination can be made by the resolution entity whether the source of the error is a network component or the cellular telephone. If the source of the error is with a the cellular telephone, the methodology proceeds to 560 where the trouble resolution entity examines the error condition message to determine more specifically where the error originated. At 575, a user contact profile can be consulted to determine an optimal method for contacting the cellular telephone user. If the source of the error is, instead, determined to be at a network component, the methodology proceeds to 565 where a more specific determination of the network components involved can be made. At 570, the resolution entity can further determine whether user input is required to help identify the best method to resolve the error. If user input is required, the methodology proceeds to 575 where a user contact profile is optionally consulted to determine an optimal method for contacting the cellular telephone user.

Figure 6:
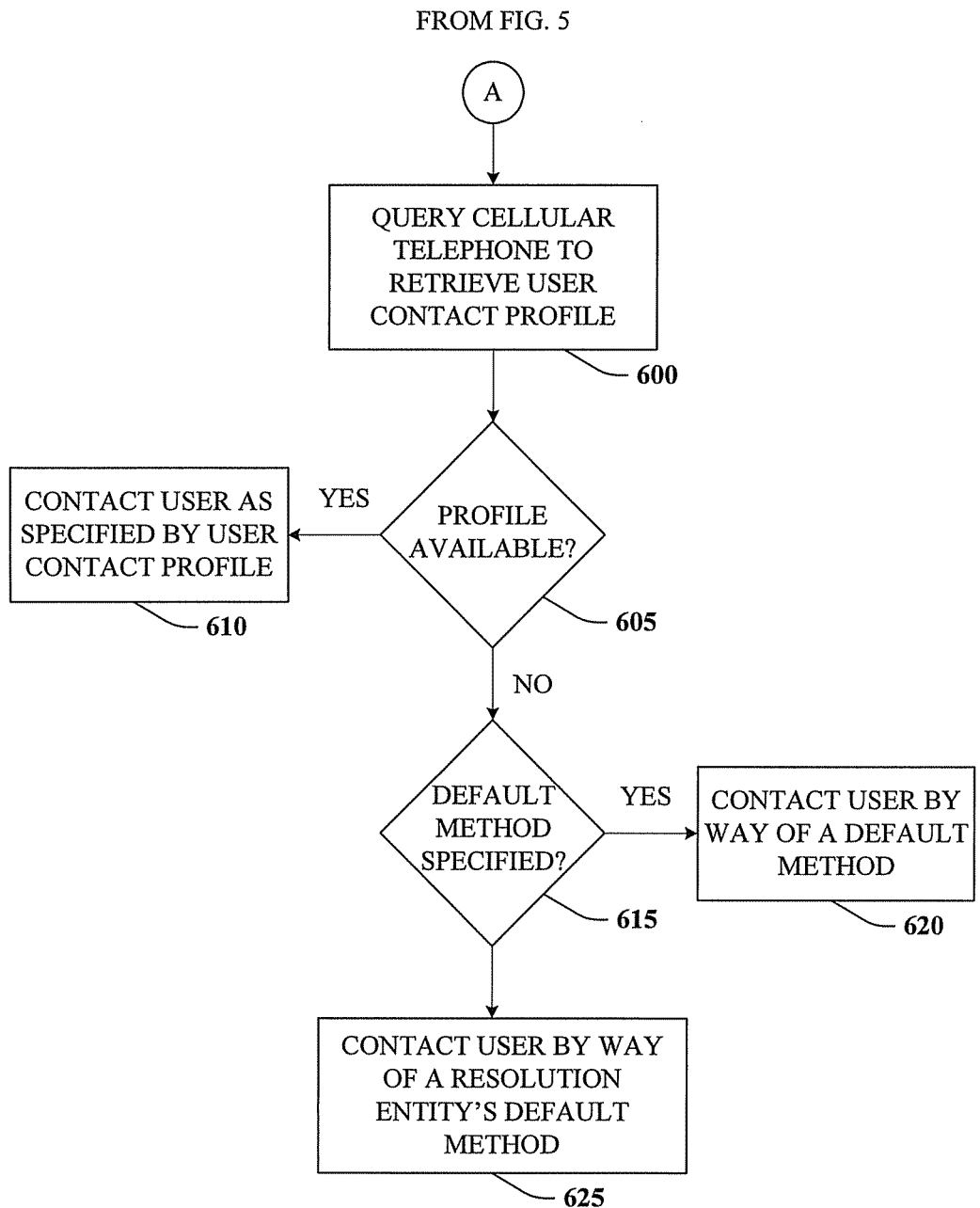
FIG. 6 is a continuation of the methodology of FIG. 5 illustrating a method of contacting a cellular telephone user.

Referring now to FIG. 6, the methodology of FIG. 5 can be continued after a user contact profile is optionally consulted to determine an optimal method for contacting the cellular telephone user. At 600, the cellular telephone can be queried to retrieve a user contact profile, if any. At 605 if a user profile is available, the cellular telephone user can be contacted for more information as specified by a user contact profile to obtain more information about resolving the problem associated with the error in connecting to the communication network described in FIG. 5.

If no user profile is available, the methodology proceeds to 615 where the resolution entity determines whether a default method is prescribed by, for example, a network provider or network service provider, for contacting a cellular telephone user. If a default method for contacting a cellular telephone user is specified by, for example a network provider or network service provider, the methodology proceeds to 620 where a cellular telephone user can be contacted according to a service provider's default method. If no default method is prescribed by a service provider, the resolution entity, at 625, contacts a cellular telephone user according to a default method established by that resolution entity.

Figure 7:
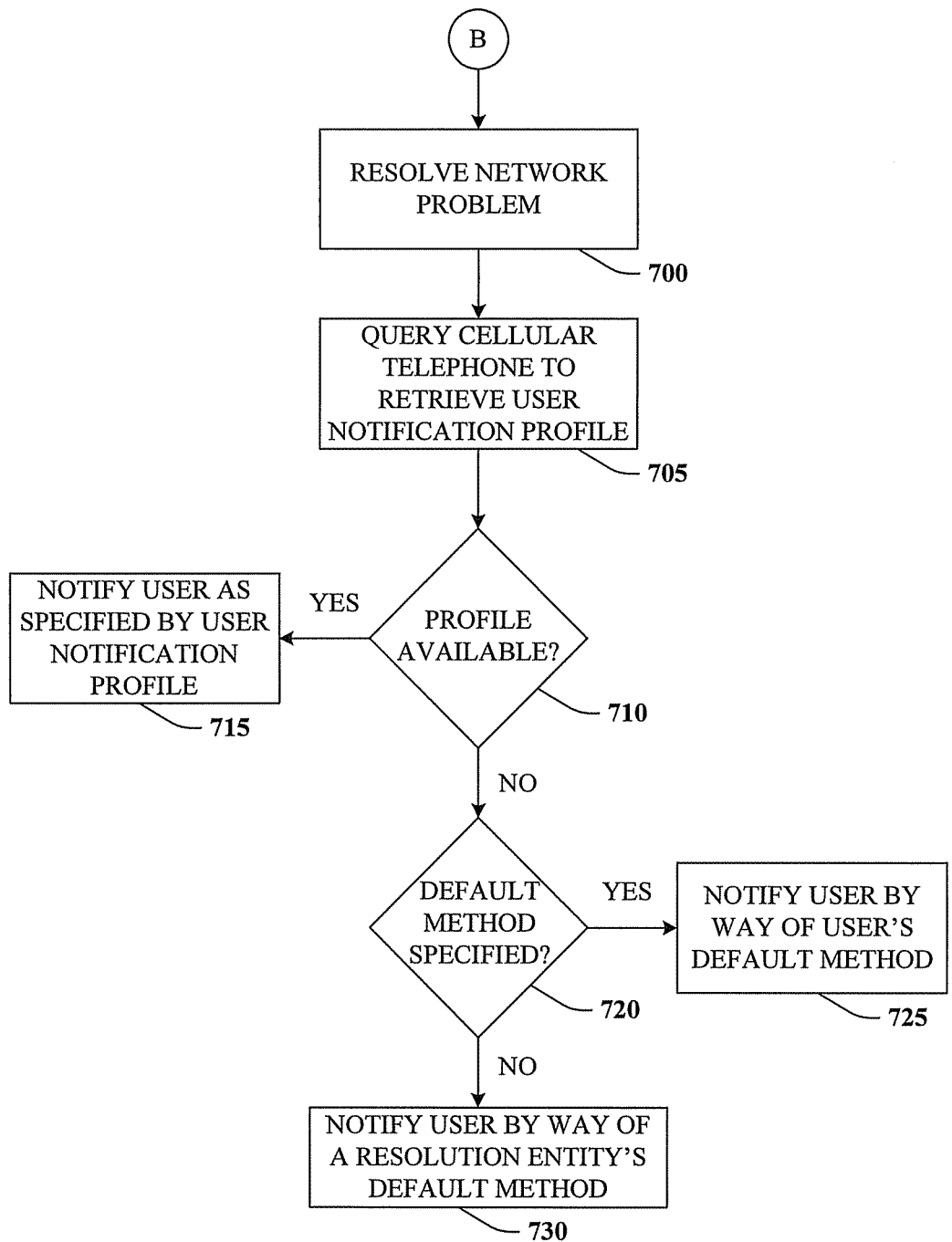
FIG. 7 is a continuation of the methodology of FIG. 5 illustrating a method of notifying a cellular telephone user that a problem has occurred and automatically corrected by a service provider.

Referring now to FIG. 7, the methodology of FIG. 5 can be continued after a determination is made that no cellular telephone user input is required to resolve a network problem. At 700, the resolution entity corrects the problem with the network component that caused the error in connecting a cellular telephone to a communication network as illustrated in FIG. 5. At 705, a cellular telephone can be queried to retrieve a cellular telephone notification profile. At 710, if a notification profile is available, the methodology proceeds to 715 where a user can be notified of a network problem and the fact that it has been resolved, according to a user notification profile. If no user profile is available, the methodology proceeds to 720 where a determination can be made as to whether a service provider has established a default method for notifying a cellular telephone user. If a service provider has established a default notification method, a user can be notified of a network problem and the fact that such problem has been resolved according to a service provider's default notification method. If no service provider notification method is established, the methodology proceeds to 730 where a cellular telephone can be notified of a network problem and the fact that it has been resolved according to the resolution entity's default method.

Figure 8:
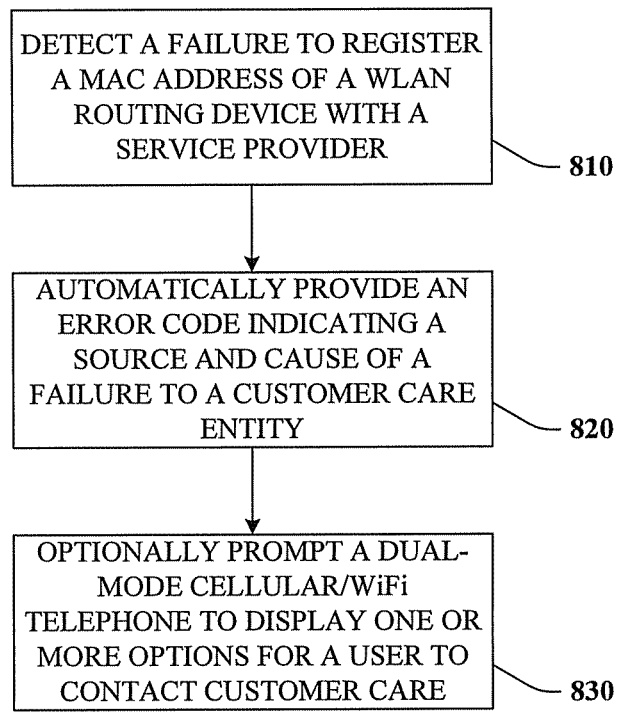
FIG. 8 is a methodology for automatically detecting an error in accordance with various aspects of the claimed subject matter.

Referring now to FIG. 8, a methodology is illustrated for detecting an error and initiating a customer care response when a dual-mode cellular/WiFi telephone fails to register a media access control (MAC) address of a WLAN router with a communication network in accordance with the subject disclosure. The methodology begins after a user has attempted to connect a dual-mode cellular/WiFi telephone to a communication network by way of a WLAN router, and a failure occurs in registering a MAC Address of a WLAN routing device with a communication service provider. At 810, a failure to register a MAC address of a WLAN routing device with a cellular service provider can be detected. At 820, an error code indicating a source and cause of a failure can be provided to a customer care entity associated with a cellular service provider without action required by a user. At 830, a dual-mode cellular/WiFi telephone can be prompted to automatically display one or more options for a dual-mode cellular telephone user to contact a customer care entity associated with a cellular service provider. Options for contacting a customer care entity include, for example, a cellular telephone call, text message, voice message, and e-mail message.

Figure 9:
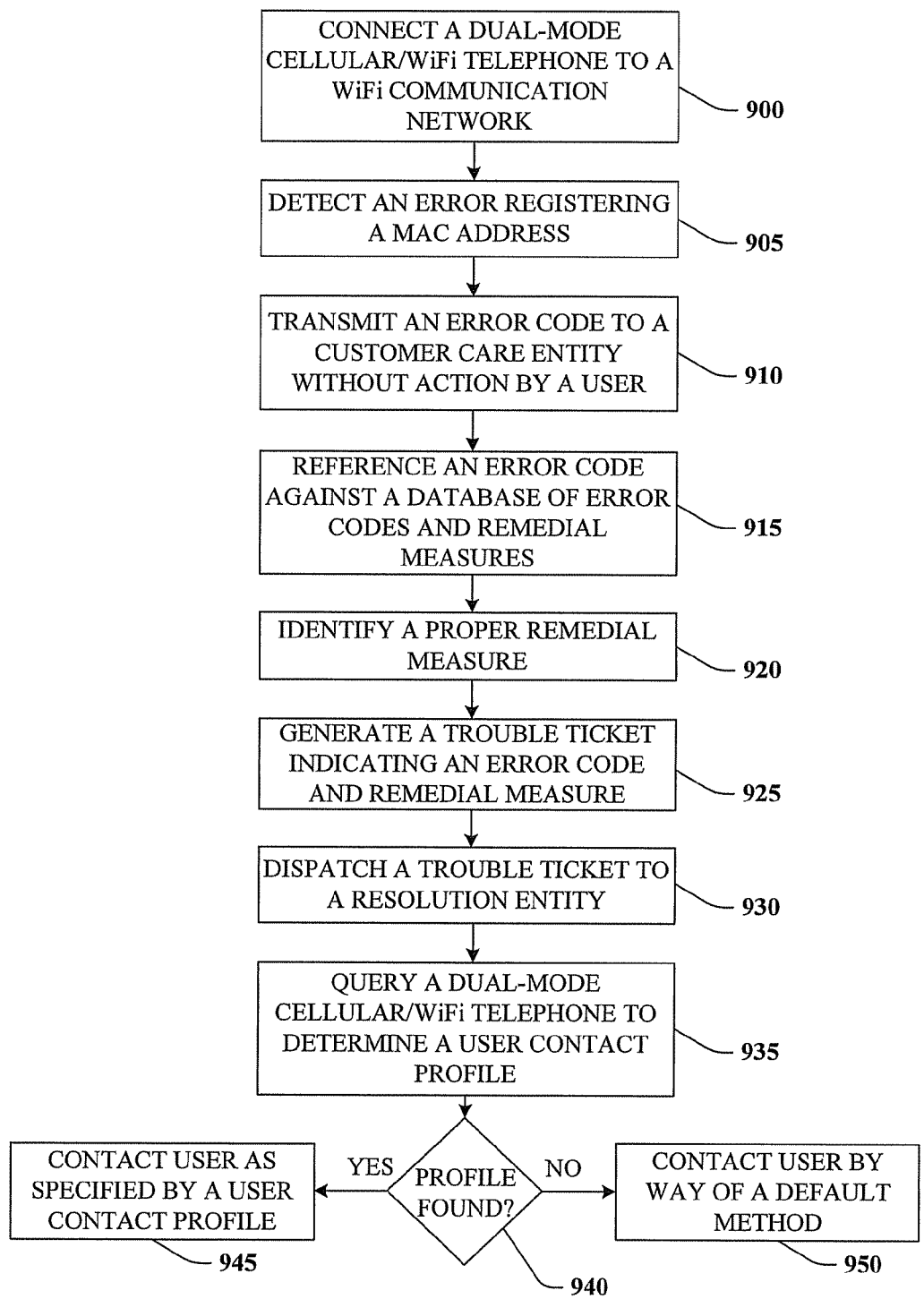
FIG. 9 is a methodology for automatically detecting a failure of a dual-mode WiFi cellular device connecting to a wireless network.

Referring now to FIG. 9, a methodology is depicted for detecting and handling an error when a dual-mode cellular/WiFi telephone fails to register a MAC address of a wireless router with a communication network. At 900, a dual-mode cellular/WiFi telephone connects to a communication network via a wireless access point (e.g., a wireless router). At 905, an error in registering a MAC address of the wireless access point with a cellular service provider can be detected.

At 910, an error code indicating an error and cause of the error can be transmitted to a customer care entity associated with the cellular service provider without action required by a cellular telephone user. Optionally, the error code can be transmitted to a customer care entity upon a cellular telephone user terminating a connection between the dual-mode cellular/WiFi telephone and the WLAN communication network. At 915, the error code can be referenced against a database of error codes and associated remedial measures for correcting a problem associated with an error. At 920, a proper remedial measure can be identified for correcting a problem associated with an error.

At 925, a trouble ticket indicating an error code and a remedial measure can be generated. At 930, the trouble ticket can be dispatched to a resolution entity associated with, for example, a network provider or network service provider responsible for maintaining a network component identified as a source of the error. At 935, a dual-mode cellular/WiFi telephone can be queried to determine whether or not a cellular telephone user has established a user-specified contact profile. At 940, a determination can be made as to whether a user-specified contact profile is available. If so, the methodology proceeds to 945 and a cellular telephone user can be contacted as specified by a user-specified contact profile. If no user-specified contact profile is available, a user can be contacted by way of a default method.

Figure 10:
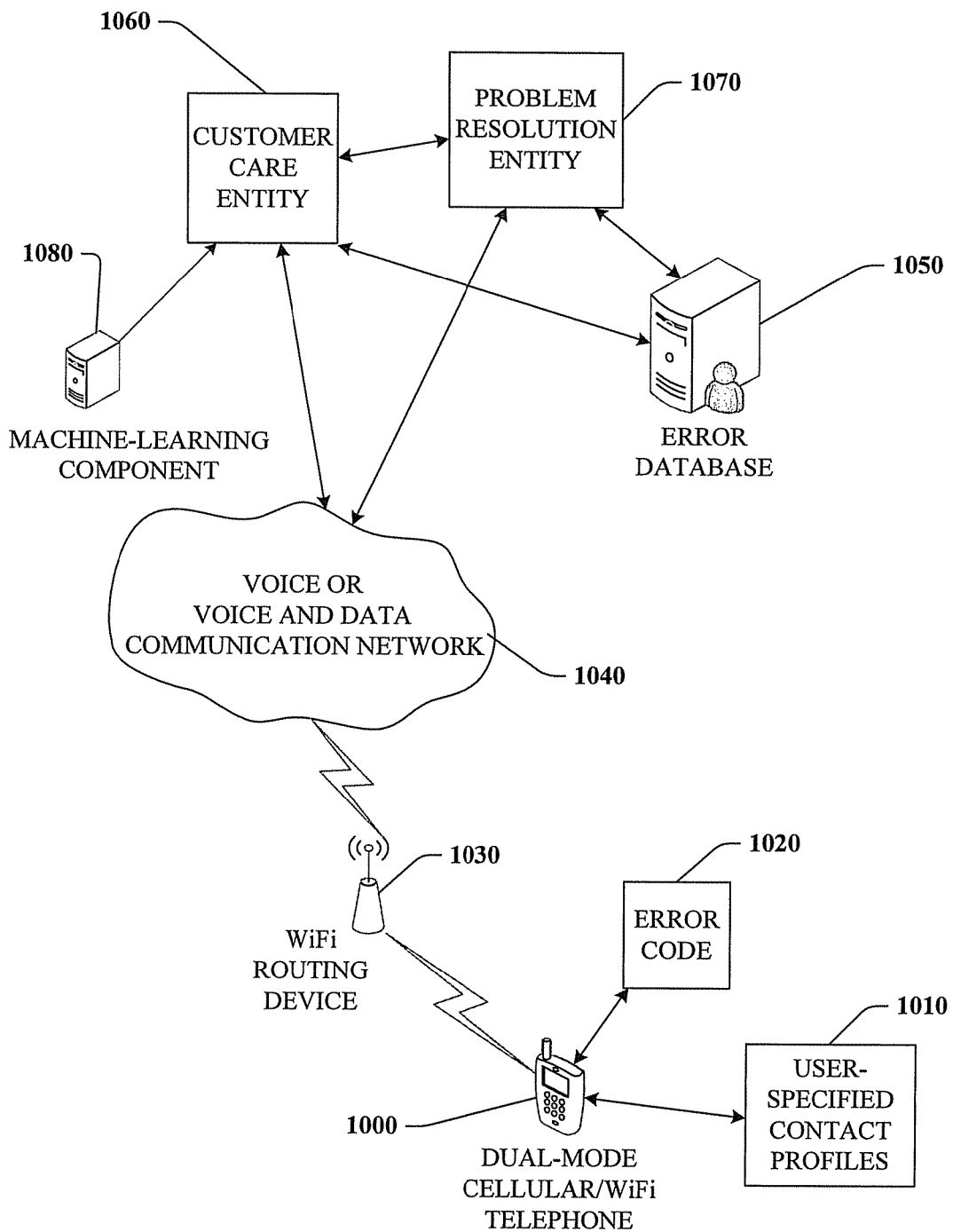
FIG. 10 is a high-level illustration of a system in accordance with an aspect of the subject disclosure.

Referring now to FIG. 10, an example system for providing automated wireless support is depicted in accordance with the subject innovation. Dual-mode cellular/WiFi telephone 1000 can be any suitable dual-mode device capable of connecting with a voice or simultaneous voice and data communication network 1040 as specified in the subject disclosure supra. Dual-mode cellular/WiFi telephone 1000 can connect to a WLAN routing device 1030 when attempting to access voice or voice and data communication network 1040 by way of, for example, a radio frequency (RF) communication transmission. If an error occurs when attempting to connect to a WLAN routing device 1030, dual-mode cellular/WiFi telephone 1000 can create an error code 1020 identifying an error and cause of the error, and automatically send error code 1020 to a customer care entity 1060 associated with a cellular service provider. Customer care entity 1060 can then provide a plurality of options for contacting customer care and/or utilizing customer care resources to dual-mode cellular/WiFi telephone 1000; no action is required by a device user for such options to be provided.

Dual-mode cellular/WiFi telephone 1000 can further be utilized to create and store user-specified contact profiles 1010. User-specified contact profiles 1010 can specify different methods with which to contact a mobile device user depending on, for example, the time of day, whether the user is in a meeting, on another call, or driving, or whether the mobile communication device is inaccessible or inoperable. A user-specified contact profile can contain an e-mail address, Instant Message profile, alternate phone number, or other method of contact. Further, a mobile device user can activate different user-specified contact profiles to specify a user-preferred method of being contacted.

Customer care entity 1060 can be any suitable entity involved in interfacing between a cellular service provider and a dual-mode cellular/WiFi telephone subscriber as described herein. Customer care entity 1060 can receive error code 1020 from dual-mode cellular/WiFi telephone 1000, and reference an error database 1050 to determine a problem resolution stored on error database 1050. Error database 1050 can be a physical or virtual device for storing digital information as disclosed herein or known in the art. Error database 1050 contains a list of error codes associated with errors in connecting dual-mode cellular/WiFi telephone 1000 with WLAN routing device 1030 and associated remedial measures for correcting a problem associated with an error.

When customer care entity 1060 receives a remedial measure or remedial measures from error database 1050 associated with an error, customer care entity 1060 can dispatch the error and associated remedial measure(s) to a problem resolution entity 1070 most appropriate for effectuating the remedial measure(s) specified by error database 1050. Problem resolution entity 1070 can resolve problems associated with errors in connecting dual-mode cellular/WiFi telephone 1000 to WLAN routing device 1030 and forward the results to customer care entity 1060. Customer care entity 1060 can further reference a machine-learning component 1080 that can determine a most appropriate method for notifying a dual-mode cellular/WiFi telephone subscriber of an error and the resolution effectuated by problem resolution entity 1070 as specified in the subject disclosure. Customer care entity 1060 can further notify a dual-mode cellular/WiFi telephone subscriber of the error and its status as specified in the subject disclosure.

Figure 11:
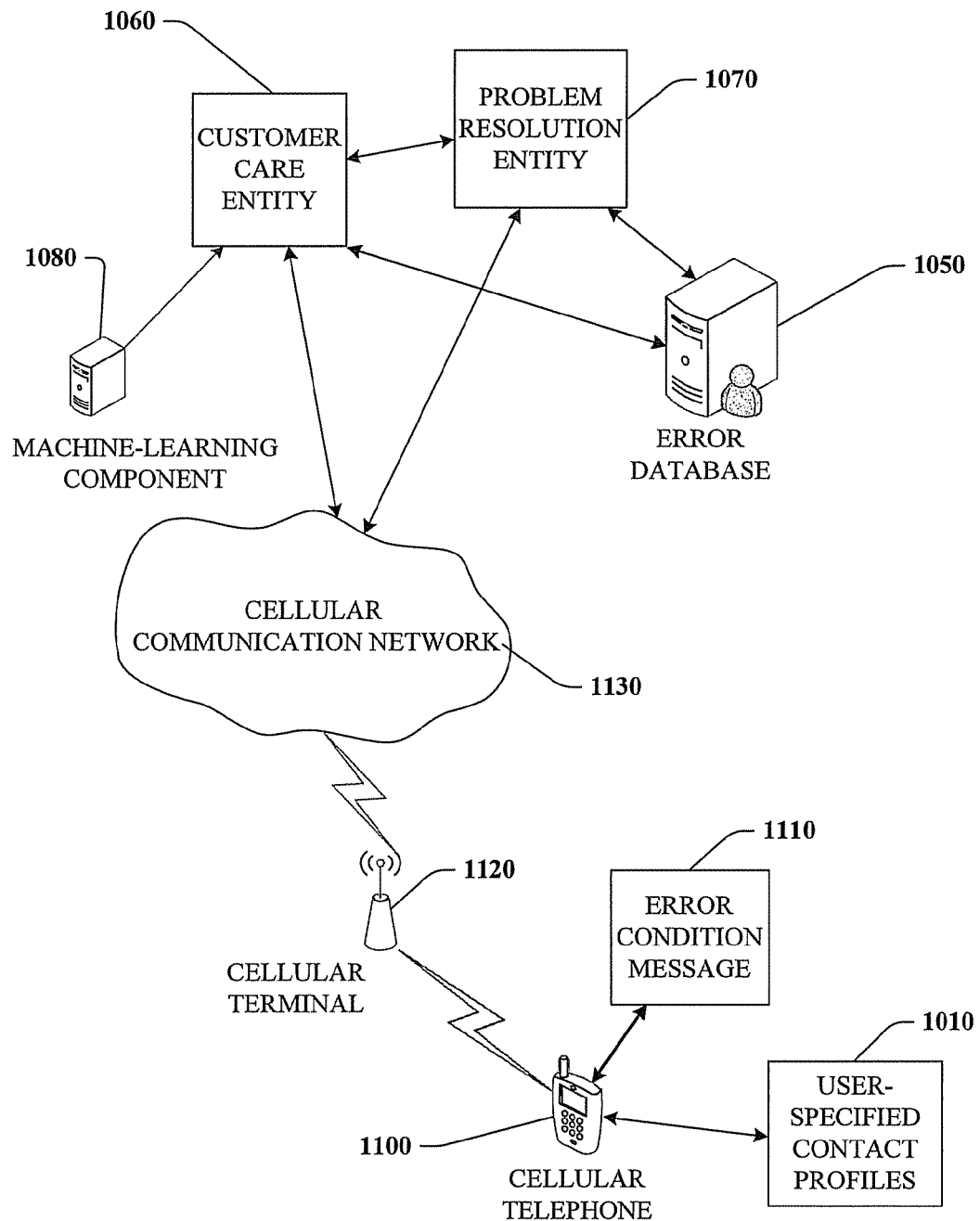
FIG. 11 is a high-level illustration of a system in accordance with an aspect of the subject disclosure.

Referring now to FIG. 11, a system is depicted that provides automated wireless support as a result of an error connecting a cellular telephone to a cellular network. The system includes components that detect an error related to a cellular telephone associated with a cellular terminal, and automatically forward diagnostic information identifying a source of the error to a customer care entity. Cellular telephone 1100 can be a cellular communication device capable of connecting to a cellular communication network 1130 as specified in the subject disclosure supra. Cellular telephone 1100 can associate with a cellular terminal 1120 in a manner allowing for exchange of data between the cellular telephone 1100, cellular terminal 1120, cellular communication network 1130 and further devices and networks associated therewith.

If an error occurs related to the association of cellular telephone 1100 and cellular terminal 1120, cellular telephone 1100 can create an error condition message 1110 with diagnostic information identifying an error and cause of the error. Error condition message 1110 can be automatically sent to a customer care entity 1060 of a cellular service provider.

Cellular telephone 1100 can further be utilized to create and store one or more user-specified contact profiles 1010. User-specified contact profiles 1010 can specify different methods with which to contact a mobile device user depending on, for example, the time of day, whether the user is in a meeting, on another call, or driving, or whether the mobile communication device is inaccessible or inoperable. A user-specified contact profile can contain an e-mail address, Instant Message profile, alternate phone number, or other method of contact. A user can modify a user-specified contact profile as desired; further, multiple contact profiles can exist such that the mobile phone user can select between multiple contact profiles as suitable.

Customer care entity 1060 can be any suitable entity that can interface between a cellular service provider and a cellular telephone subscriber as described herein. Customer care entity 1060 can receive error condition message 1110 containing diagnostic information related to an association between cellular telephone 1100 and cellular terminal 1120. Subsequent receiving such information customer care entity 1060 can reference an error database 1050 to determine a solution for an error. Error database 1050 can be a physical or virtual device configured to store digital information. Error database 1050 contains a list of error codes relating to cellular telephone 1100 in association with cellular terminal 1120 and remedial measures for correcting an error.

When customer care entity 1060 receives one or more remedial measures from error database 1050, customer care entity 1060 can dispatch the error and associated remedial measure(s) to a problem resolution entity 1070 most appropriate for effectuating the remedial measure(s) specified by error database 1050. Customer care entity 1060 can further reference a machine-learning component 1080 that can determine a most appropriate method for notifying a cellular telephone subscriber of an error and its status. In addition, customer care entity 1060 can provide a cellular telephone subscriber with a plurality of options for contacting customer care and/or utilizing customer care resources.

Figure 12:
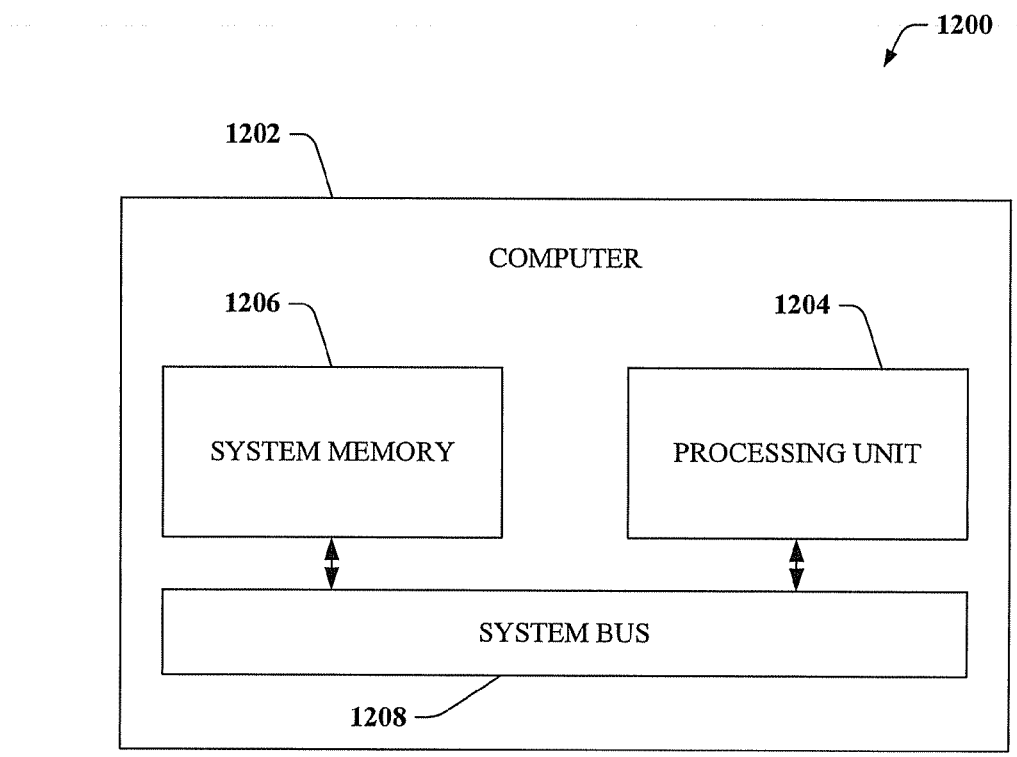
FIG. 12 illustrates an example computing environment that can be employed in connection with various aspects described herein.

Referring now to FIG. 12, there is illustrated a block diagram of a computer operable to provide networking and communication capabilities between a wired or wireless communication network and a server and/or communication device. While shown through use of a computer or computing components, it is understood that the claimed subject matter can be implemented as a method, apparatus, or article of manufacture using standard programming and/or engineering techniques to produce software, firmware, hardware, or combinations thereof to control a computing device, such as a mobile handset, to implement the disclosed subject matter. The term "article of manufacture" as used herein is intended to encompass a computer program accessible from any suitable computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, SIM cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

In order to provide additional context for various aspects of the claimed subject matter, FIG. 12 and the following discussion are intended to provide a brief, general description of a suitable computing environment 1200 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors, such a single core processor, a multi-core processor, or any other suitable arrangement of processors. The system bus 1208 can be any of several types of bus structure that can further interconnect to a memory bus (with or without a memory controller), a peripheral bus, and a local bus using any of a variety of commercially available bus architectures. The system memory 1206 can include read-only memory (ROM), random access memory (RAM), high-speed RAM (such as static RAM), EPROM, EEPROM, and/or the like. Additionally or alternatively, the computer 1202 can include a hard disk drive, upon which program instructions, data, and the like can be retained. Moreover, removable data storage can be associated with the computer 1202. Hard disk drives, removable media, etc. can be communicatively coupled to the processing unit 1204 by way of the system bus 1208.

The system memory 1206 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1202 through one or more wired/wireless input devices, such as a keyboard, pointing and clicking mechanism, pressure sensitive screen, microphone, joystick, stylus pen, etc. A monitor or other type of interface can also be connected to the system bus 1208.

The computer 1202 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1202 can connect to other devices/networks by way of antenna, port, network interface adaptor, wireless access point, modem, and/or the like.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
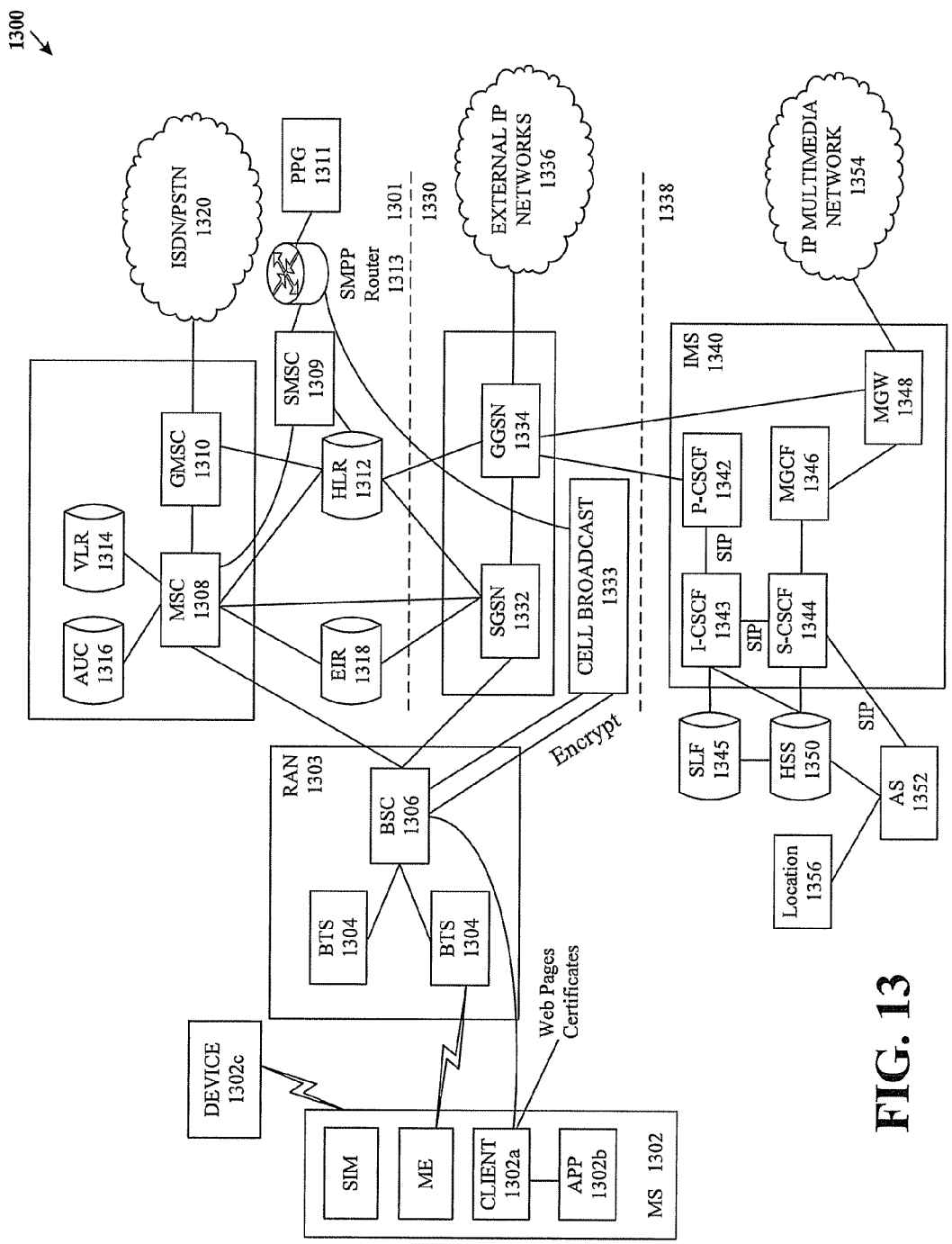
FIG. 13 is an example networking environment in accordance with various aspects of the subject disclosure.

Now turning to FIG. 13, such figure depicts a GSM/GPRS/IP multimedia network architecture 1300 that includes a GSM core network 1301, a GPRS network 1330 and an IP multimedia network 1338. The GSM core network 1301 includes a Mobile Station (MS) 1302, at least one Base Transceiver Station (BTS) 1304 and a Base Station Controller (BSC) 1306. The MS 1302 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1302 includes an embedded client 1302a that receives and processes messages received by the MS 1302. The embedded client 1302a can be implemented in JAVA and is discuss more fully below.

The embedded client 1302a communicates with an application 1302b that provides services and/or information to an end user. One example of the application can be navigation software that provides near real-time traffic information that is received via the embedded client 1302a to the end user. The navigation software can provide road conditions, suggest alternate routes, etc. based on the location of the MS 1302. Those of ordinary skill in the art understand that there are many different methods and systems of locating an MS 1302.

Alternatively, the MS 1302 and a device 1302c can be enabled to communicate via a short-range wireless communication link, such as BLUETOOTH. For example, a BLUETOOTH SIM Access Profile can be provided in an automobile (e.g., device 1302c) that communicates with the SIM in the MS 1302 to enable the automobile's communications system to pull information from the MS 1302. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1302c. There can be an endless number of devices 1302c that use the SIM within the MS 1302 to provide services, information, data, audio, video, etc. to end users.

The BTS 1304 is physical equipment, such as a radio tower, that enables a radio interface to communicate with the MS. Each BTS can serve more than one MS. The BSC 1306 manages radio resources, including the BTS. The BSC can be connected to several BTSs. The BSC and BTS components, in combination, are generally referred to as a base station (BSS) or radio access network (RAN) 1303.

The GSM core network 1301 also includes a Mobile Switching Center (MSC) 1308, a Gateway Mobile Switching Center (GMSC) 1310, a Home Location Register (HLR) 1312, Visitor Location Register (VLR) 1314, an Authentication Center (AuC) 1318, and an Equipment Identity Register (EIR) 1316. The MSC 1308 performs a switching function for the network. The MSC also performs other functions, such as registration, authentication, location updating, handovers, and call routing. The GMSC 1310 provides a gateway between the GSM network and other networks, such as an Integrated Services Digital Network (ISDN) or Public Switched Telephone Networks (PSTNs) 1320. In other words, the GMSC 1310 provides interworking functionality with external networks.

The HLR 1312 is a database or component(s) that comprises administrative information regarding each subscriber registered in a corresponding GSM network. The HLR 1312 also includes the current location of each MS. The VLR 1314 is a database or component(s) that contains selected administrative information from the HLR 1312. The VLR contains information necessary for call control and provision of subscribed services for each MS currently located in a geographical area controlled by the VLR. The HLR 1312 and the VLR 1314, together with the MSC 1308, provide the call routing and roaming capabilities of GSM. The AuC 1316 provides the parameters needed for authentication and encryption functions. Such parameters allow verification of a subscriber's identity. The EIR 1318 stores security-sensitive information about the mobile equipment.

A Short Message Service Center (SMSC) 1309 allows one-to-one Short Message Service (SMS) messages to be sent to/from the MS 1302. A Push Proxy Gateway (PPG) 1311 is used to "push" (e.g., send without a synchronous request) content to the MS 1302. The PPG 1311 acts as a proxy between wired and wireless networks to facilitate pushing of data to the MS 1302. A Short Message Peer to Peer (SMPP) protocol router 1313 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1302 sends a location update including its current location information to the MSC/VLR, via the BTS 1304 and the BSC 1306. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1330 is logically implemented on the GSM core network architecture by introducing two packet-switching network nodes, a serving GPRS support node (SGSN) 1332, a cell broadcast and a Gateway GPRS support node (GGSN) 1334. The SGSN 1332 is at the same hierarchical level as the MSC 1308 in the GSM network. The SGSN controls the connection between the GPRS network and the MS 1302. The SGSN also keeps track of individual MS's locations and security functions and access controls.

A Cell Broadcast Center (CBC) 1333 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1334 provides a gateway between the GPRS network and a public packet network (PDN) or other IP networks 1336. That is, the GGSN provides interworking functionality with external networks, and sets up a logical link to the MS through the SGSN. When packet-switched data leaves the GPRS network, it is transferred to an external TCP-IP network 1336, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1338 was introduced with 3GPP Release 5, and includes an IP multimedia subsystem (IMS) 1340 to provide rich multimedia services to end users. A representative set of the network entities within the IMS 1340 are a call/session control function (CSCF), a media gateway control function (MGCF) 1346, a media gateway (MGW) 1348, and a master subscriber database, called a home subscriber server (HSS) 1350. The HSS 1350 can be common to the GSM network 1301, the GPRS network 1330 as well as the IP multimedia network 1338.

The IP multimedia system 1340 is built around the call/session control function, of which there are three types: an interrogating CSCF (I-CSCF) 1343, a proxy CSCF (P-CSCF) 1342, and a serving CSCF (S-CSCF) 1344. The P-CSCF 1342 is the MS's first point of contact with the IMS 1340. The P-CSCF 1342 forwards session initiation protocol (SIP) messages received from the MS to an SIP server in a home network (and vice versa) of the MS. The P-CSCF 1342 can also modify an outgoing request according to a set of rules defined by the network operator (for example, address analysis and potential modification).

The I-CSCF 1343 forms an entrance to a home network and hides the inner topology of the home network from other networks and provides flexibility for selecting an S-CSCF. The I-CSCF 1343 can contact a subscriber location function (SLF) 1345 to determine which HSS 1350 to use for the particular subscriber, if multiple HSS's 1350 are present. The S-CSCF 1344 performs the session control services for the MS 1302. This includes routing originating sessions to external networks and routing terminating sessions to visited networks. The S-CSCF 1344 also decides whether an application server (AS) 1352 is required to receive information on an incoming SIP session request to ensure appropriate service handling. This decision is based on information received from the HSS 1350 (or other sources, such as an application server 1352). The AS 1352 also communicates to a location server 1356 (e.g., a Gateway Mobile Location Center (GMLC)) that provides a position (e.g., latitude/longitude coordinates) of the MS 1302.

The HSS 1350 contains a subscriber profile and keeps track of which core network node is currently handling the subscriber. It also supports subscriber authentication and authorization functions (AAA). In networks with more than one HSS 1350, a subscriber location function provides information on the HSS 1350 that contains the profile of a given subscriber.

The MGCF 1346 provides interworking functionality between SIP session control signaling from the IMS 1340 and ISUP/BICC call control signaling from the external GSTN networks (not shown). It also controls the media gateway (MGW) 1348 that provides user-plane interworking functionality (e.g., converting between AMR- and PCM-coded voice). The MGW 1348 also communicates with other IP multimedia networks 1354.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    detecting, by a system including a processor, an error condition associated with interfacing a mobile communication device to a network device including detecting, by the system, a failure to register a media access control address of a wireless local area network router device with a service provider;
    gathering, by the system, diagnostic information from a plurality of components of the network indicating the error condition;

sending, by the system, the diagnostic information directed to a customer care device to facilitate identification of a set of sources of the error condition;

receiving, by the system based on a user specified contact profile that specifies a contact of a subscriber identity associated with the mobile communication device based on determined activities of the subscriber identity, customer care information from the customer care device including options for utilizing customer care resources;

evaluating, by the system utilizing a machine learning device having artificial intelligence, user information associated with the mobile communication device for sending support information directed to the mobile communication device based on the options; and selecting, by the system utilizing the machine learning device based on the user specified contact profile and the user information, a mode for sending an error notification representing the error condition to the mobile communication device.

2. The method of claim 1, wherein the gathering the diagnostic information further includes determining, by the system, whether a first failure detected by a first component of the plurality of components is substantially similar to a second failure detected by a second component of the plurality of components.

3. The method of claim 2, wherein the sending the diagnostic information further includes sending the diagnostic information directed to the customer care device in response to determining that the first failure is substantially similar to the second failure.

4. The method of claim 1, further comprising sending, by the system based on the mode, the error notification to the mobile communication device.

5. The method of claim 1, further comprising receiving, by the system, information representing the error condition from the mobile communication device.

6. The method of claim 1, wherein the receiving the customer care information further includes receiving, by the system, information representing a capability of the mobile communication device.

7. The method of claim 1, wherein the receiving the customer care information further includes receiving, by the system, options for selecting a communications protocol.

8. A system, comprising:
a memory that stores executable instructions; and
a processor, coupled to the memory, that facilitates execution of the executable instructions to perform operations, comprising:
detecting a registration failure of a mobile phone associated with a network including detecting a failure to register a media access control address of a wireless local area network router device with a service provider;
sending first information identifying a set of causes of the registration failure directed to a device associated with the service provider;
receiving, based on a user specified contact profile that specifies a contact of a subscriber identity associated with the mobile phone according to determined activities of the subscriber identity, second information representing options for utilizing resources of the service provider for correcting the registration failure;

evaluating third information associated with the mobile phone for sending support information representing the registration failure directed to the mobile phone based on the options; and
determining, based on the user specified contact profile and the third information, a mode for the sending of the support information utilizing a machine-learning device with artificial intelligence.

9. The system of claim 8, wherein the mobile phone is a dual-mode cellular and wireless fidelity telephone.

10. The system of claim 8, wherein the network is a wireless local area network.

11. The system of claim 8, wherein the operations further comprise:
determining whether a first cause of the set of causes is substantially similar to a second cause of the set of causes.

12. The system of claim 11, wherein the operations further comprise:
sending information representing the first cause is substantially similar to the second cause.

13. The system of claim 8, wherein the operations further comprise:
sending the support information directed to the mobile phone based on the mode.

14. The system of claim 8, wherein the operation further comprise:
receiving information representing a cause of the set of causes from the mobile phone.

15. A non-transitory computer-readable storage medium comprising computer executable instructions that, in response to execution, cause a computing system including a processor to perform operations, comprising: detecting an error condition associated with interfacing a mobile phone of a subscriber identity to a network device including detecting a failure to register a media access control address of a wireless local area network router device with a service provider; sending diagnostic information identifying a set of causes of the error condition directed to a device associated with the service provider; receiving, based on a user specified contact profile specifying a contact of the subscriber identity according to determined activities of the subscriber identity, customer care information representing options for utilizing resources for correcting the error condition; evaluating, using a machine learning device having artificial intelligence, user information associated with the mobile phone for sending support information directed to the mobile phone based on the options; and determining, based on the user specified contact profile and the user information a mode for the sending of the support information utilizing the machine-learning device.

16. The non-transitory computer-readable storage medium of claim 15, wherein the operations further comprise: determining whether a first cause of the set of causes is substantially similar to a second cause of the set of causes.

17. The non-transitory computer-readable storage medium of claim 16, wherein the operations further comprise: sending information representing the first cause is substantially similar to the second cause.

* * * * *